United States Patent [19]

Riley

[11] Patent Number: 4,799,639

[45] Date of Patent: Jan. 24, 1989

[54] CLAMPS

[76] Inventor: Keith Riley, Fairways, 6, Wood Close, Roughlee, Nelson, Lancashire, England

[21] Appl. No.: 27,595

[22] Filed: Mar. 18, 1987

[51] Int. Cl.$^4$ .............................................. F16M 13/00
[52] U.S. Cl. .................................. 248/228; 248/231.5; 24/522
[58] Field of Search ...................... 248/72, 228, 231.5, 248/231.6, 316.5, 316.6, 289.1; 24/522, 514

[56] References Cited

U.S. PATENT DOCUMENTS

| | | | |
|---|---|---|---|
| 483,963 | 10/1892 | Leger | 248/316.5 |
| 764,774 | 7/1904 | Sargeant | 248/289.1 |
| 2,057,980 | 10/1936 | Ringzelli | 248/231.5 |
| 2,431,134 | 11/1947 | Monnia | 248/289.1 |
| 2,589,520 | 3/1952 | Wallenius | 248/231.5 |

FOREIGN PATENT DOCUMENTS 1397075  6/1975  United Kingdom ............... 248/228

Primary Examiner—J. Franklin Foss
Assistant Examiner—Robert A. Olson
Attorney, Agent, or Firm—Murray & Whisenhunt

[57] ABSTRACT

A clamp for use in attaching items to an overhead flanged beam comprises a first jaw 10 and a second jaw 11. First ends 13 and 15 of the jaws are shaped for engagement respectively with the flanges of an overhead flanged beam. Second ends 16 and 17 of the jaws are pivotly interconnected by a pivot bolt 18. Attachment means in the form of a shackle 20 is attached to bolt 18. Attached to each jaw is a swivel 24 and the swivels 24 are threadedly interconnected by a screw threaded rod 27. When the rod 27 is rotated, the jaws 10 and 11 move towards or away from one another. The swivels 24 are connected to the jaws by bolts 26, so that the swivels and bar 27 are readily removable for maintenance or replacement.

4 Claims, 1 Drawing Sheet

CLAMPS

BACKGROUND TO THE INVENTION

The invention relates to clamps, and particularly to clamps for use in attaching items to overhead flanged beams.

DESCRIPTION OF THE PRIOR ART

Various types of clamp are already known for use in attaching items to overhead flanged beams. These clamps usually include attachment means, for example, in the form of a shackle, through which a rope or cable may be passed, for example, to suspend a load from the beam.

The known clamps are often cumbersome to use, and difficult to service and maintain.

OBJECT OF THE INVENTION

It is the object of the invention to provide a clamp for use in attaching items to an overhead flanged beam, the clamp being easier to use and maintain than known clamps.

According to the invention, a clamp for use in attaching items to an overhead flanged beam comprises a first jaw having first and second ends, the said first end being shaped for engagement with one flanged of an overhead flange beam; a second jaw having first and second ends, the said first end being shaped for engagement with a second opposed flange of the said overhead beam; pivot means pivotally connecting together the said second ends of the said first and second jaws; attachment means connected to said pivot means; first swivel means positioned on first saw jaw intermediate said said first and second ends; second swivel means positioned on said second jaw intermediate said first and second ends; connecting means extending between said first and second swivel means for pivoting said jaws towards one another to clamp said beam between said first ends of said jaws; and release means for releasing said swivels from the said jaws.

Other objects and advantages of the invention will become apparent from the following description of an embodiment of the invention, given by way of example.

DESCRIPTION OF THE EMBODIMENT

Figure 2:
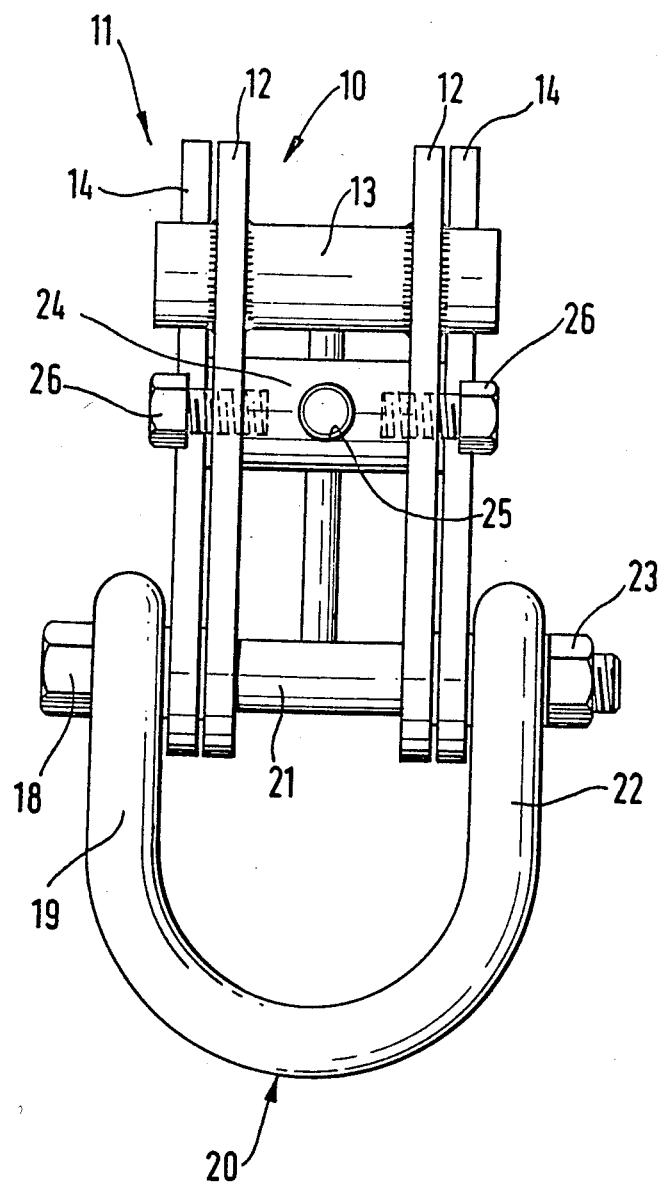
FIG. 2 is a side view of the clamp shown in FIG. 1.

The clamp shown in the Figures comprises a first jaw 10 and a second jaw 11. The jaw 10 comprises a pair of plates 12 spaced apart by channel member 13 welded therebetween. By means of the channel member 13 a first end of the jaw 10 is thus shaped for engagement with one flange of an overhead flanged beam. The jaw 11 similarly comprises plates 14 spaced apart by a channel member 15 so that one end of the jaw 11 can engage with a second flange of an overhead flanged beam. The plates 12 are closer together than the plates 14, as can be seen from FIG. 2, so that the lower end 16 of the jaw 10 can sit within the lower end 17 of the jaw 11. These lower ends, 16 and 17 are pivotally interconnected by a bolt 18 which passes firstly through one arm 19 of a shackle 20, then through one of the plates 14, then through one of the plates 12, then through a spacer sleeve 21, then through the other of the plates 12, then through the other of the plates 14, then through the other arm 22 of the shackle 20, and finally through a retaining nut 23.

Between the plates of each jaw there is arranged a swivel member. Only one of these swivel members can be seen in the drawings, at 24 in FIG. 2, but the swivels are identical, except that the one between the plates 14 is longer, because of the greater spacing of the plates 14. Only the swivel 24 will be described in detail.

The swivel 24 comprises a cylindrical block of metal which has a screw threaded apperture 25 therethrough. The swivel is held in position by two bolts 26 which pass through the plates 12. The bolts fit tightly into the swivel 24 but are a loose fit in the plates 12, so that the swivel 24 can rotate freely with respect to the plates.

A screw threaded rod 27 having left and right handed threaded portions, is screw threaded into the two swivels. The rod 27 has a Tommy bar 28 at one end.

Figure 1:
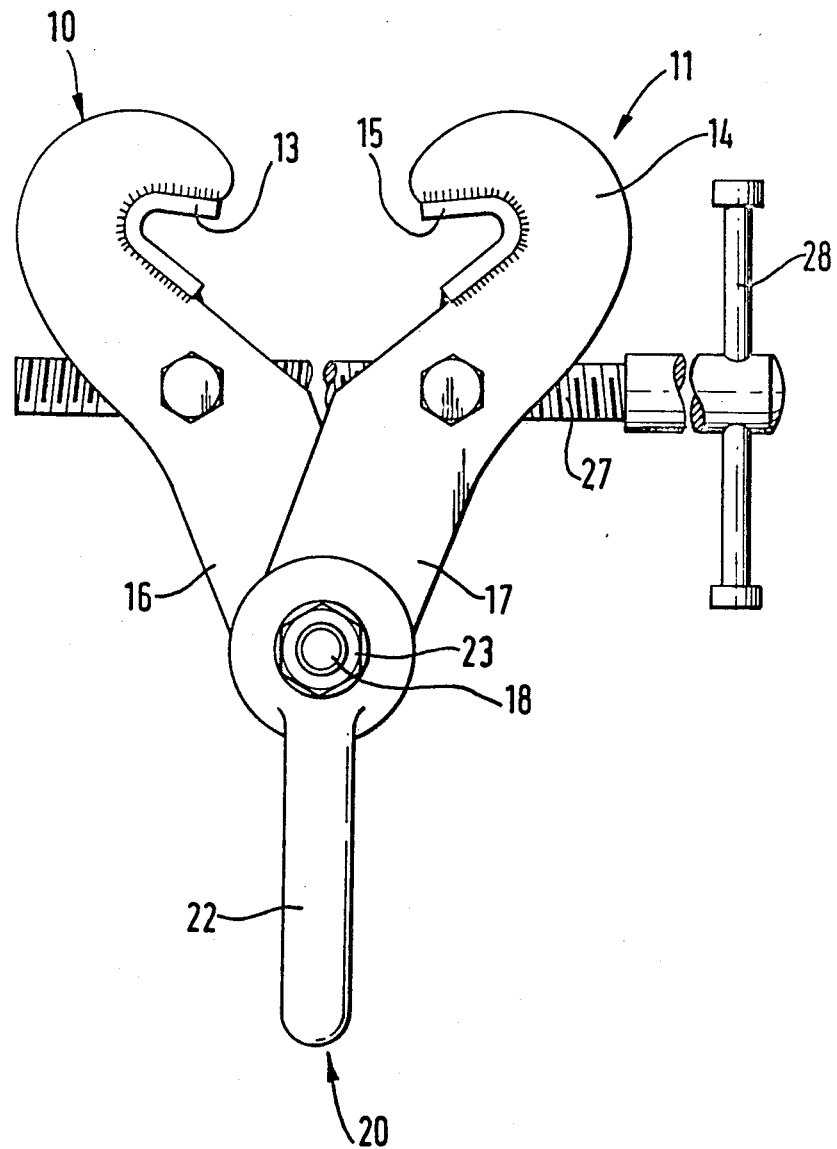
FIG. 1 is an end view of an embodiment of clamp according to the invention.

In use, if it is desired to fit the clamp to an overhead I-section beam, then the Tommy bar 28 is rotated in one direction to pivot the jaws 10 and 11 apart and increase the spacing A shown in FIG. 1. The channel members 13 and 15 are then positioned adjacent to the flanges of the beam and the Tommy bar 28 is then rotated in the reverse direction to trap the beam between the channel members 13 and 15. The shackle 20 can then be used to suspend any desired items from the beam.

If it is desired to obtain access to the swivels and the bar 27, for example for maintenance or replacement, because of wear of the threads, it is not necessary to take the entire clamp to pieces. It is only necessary to remove the bolts 26 to free the swivels 24.

The invention is not restricted to the details of the foregoing embodiment.

I claim:

1. A clamp for attaching an item to an overhead flanged beam having first and second flanges said clamp comprising:
   a. a first jaw having first and second ends, said first end being shaped for engagement with the first flange of said beam;
   b. a second jaw having first and second ends, said first end being shaped for engagement with the second flange of said beam;
   c. pivot means pivotally connecting together the second ends of the first and second jaws;
   d. attachment means connected to said pivot means for attaching said item to said clamp;
   e. first swivel means positioned on said first jaw intermediate said first and second ends thereof;
   f. second swivel means positioned on said second jaw intermediate said first and second ends thereof;
   g. connecting means extending between said first and second swivel means and threadedly engaged with said first and second swivel means, with the engagement with the first swivel means being a left hand thread and the engagement with the second swivel means being a right hand thread, said connecting means for pivoting said jaws towards one another to clamp a beam between the first ends of the jaws;
   h. release means for releasing the swivel means from the jaws,
   said first jaw being angled intermediate the first and second ends thereof toward the second jaw, and said second jaw being angled intermediate the first and second ends thereof toward the first jaw, to reduce the distance between the first and second swivel means.

2. A clamp as claimed in claim 1 in which each said jaw comprises a pair of spaced apart plates, each said swivel means comprising a member extending between said plates and pivotally connected to each said plate.

3. A clamp as claimed in claim 2, in which said member is pivotally connected to said plates by two bolts extending respectively through said plates, said bolts comprising said release means.

4. A clamp as claimed in claim 3, wherein said bolts fit tightly into said swivel means but are a loose fit in said jaws, so that each swivel means can rotate freely with respect to the respective jaws.

* * * * *